Sept. 10, 1946.       R. F. HAYS, JR       2,407,275
RADIO SCANNING APPARATUS
Filed July 29, 1944       3 Sheets-Sheet 1
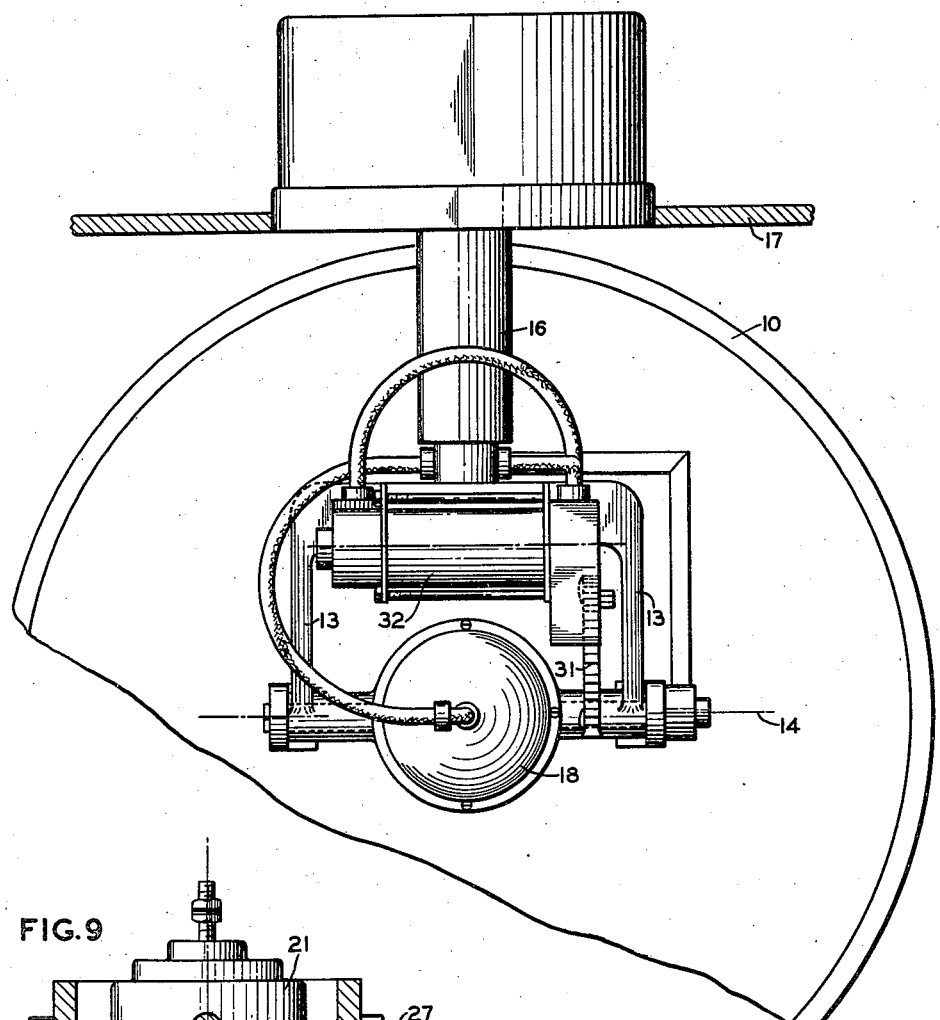
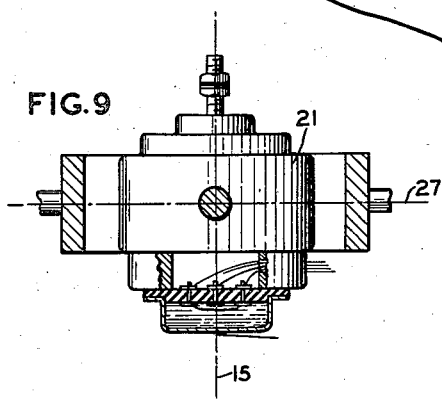
INVENTOR
ROBERT F. HAYS, JR.
his ATTORNEY Sept. 10, 1946.  R. F. HAYS, JR  2,407,275
RADIO SCANNING APPARATUS
Filed July 29, 1944  3 Sheets-Sheet 2
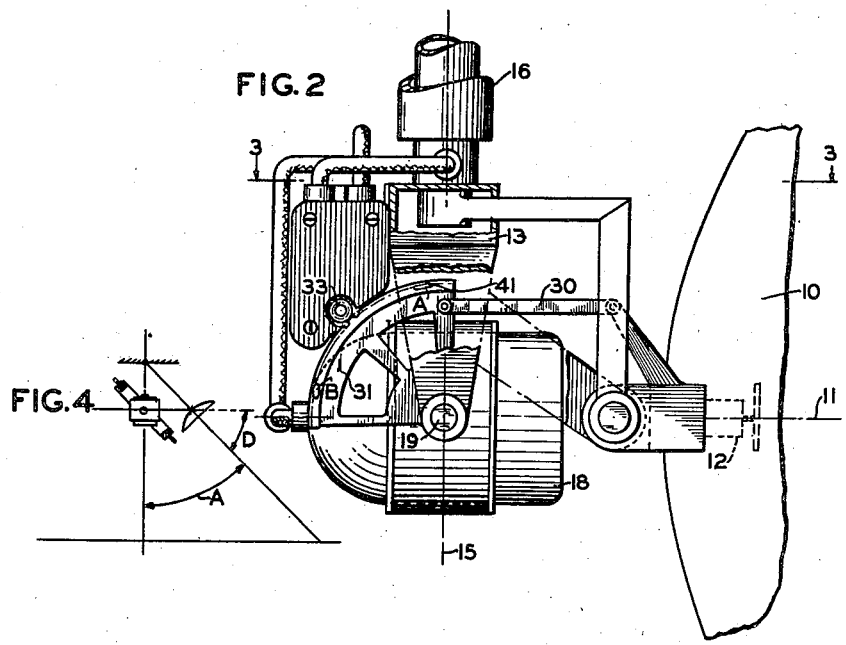
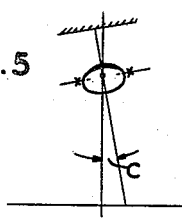
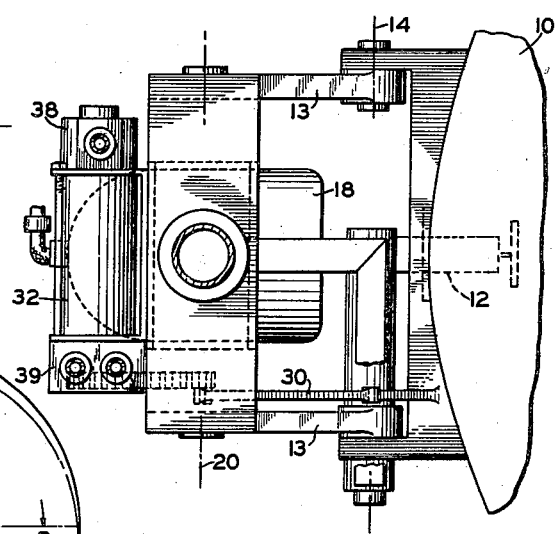
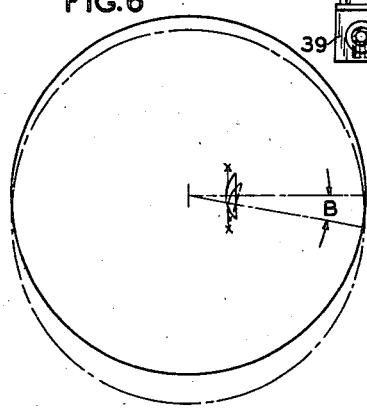
INVENTOR
ROBERT F. HAYS, JR.
BY
ATTORNEY Sept. 10, 1946.  R. F. HAYS, JR  2,407,275
RADIO SCANNING APPARATUS
Filed July 29, 1944  3 Sheets-Sheet 3

INVENTOR
ROBERT F. HAYS, JR
BY
his ATTORNEY

Patented Sept. 10, 1946

2,407,275

UNITED STATES PATENT OFFICE 2,407,275

RADIO SCANNING APPARATUS

Robert F. Hays, Jr., Syosset, N. Y., assignor to Sperry Gyroscope Company, Inc., a corporation of New York Application July 29, 1944, Serial No. 547,152

24 Claims. (Cl. 250—11)

This invention relates to radio scanning apparatus.

One of the objects of the invention is to provide a scanning apparatus for dirigible craft having a directive antenna, the sighting angle of which is determined with reference to a truly vertical axis.

Another object of the invention is to stabilize the antenna so the sighting angle thereof does not change with changes in the attitude of the craft in which the apparatus is employed.

A further object of the invention is to correct the indicating means of the scanning apparatus for errors introduced therein due to the constancy of the sighting angle of the directive antenna when the normally horizontal axis of the antenna tilts out of a horizontal plane.

One of the features of the invention resides in the provisions for mounting a gyro instrument on the frame of the antenna of a radio scanner that is movable about mutually perpendicular axes in such a manner that movement of the antenna does not cause undesired precession in the gyro instrument.

Another feature of the invention consists in pivotally mounting the casing of the gyro instrument on the antenna frame on an axis parallel to one of the axes thereof and providing means for maintaining parallelism of these parts relative to the respective parallel axes thereof.

A further feature of the invention resides in situating the spin axis of the rotor of the gyro instrument so that it is normally coincident with one of the axes of the antenna of the scanning apparatus.

Still another feature of the invention consists in the utilization of servo means that is effective to correspondingly move both the casing of the gyro instrument and the antenna of the apparatus about their respective parallel axes.

A further feature of the invention resides in the utilization of an erecting means for the gyro vertical whose reference element is situated along the vertical axis of the antenna.

Other objects, features and structural details of the invention will be apparent from the following description when read in relation to the accompanying drawings, wherein:

Fig. 1 is a rear elevation of an apparatus constructed in accordance with the present invention;

Fig. 2 is a detail side elevation of the apparatus shown in Fig. 1;

Fig. 3 is a detail plan view of the apparatus illustrated in Figs. 1 and 2;

Figs. 4, 5 and 6 are schematic views that respectively show the sighting angle of the antenna, the error introducing roll or bank angle of the antenna and the azimuth correction angle;

Fig. 9 is a detail side elevation of the gyro vertical showing the reference element provided the instrument.

Figure 7:
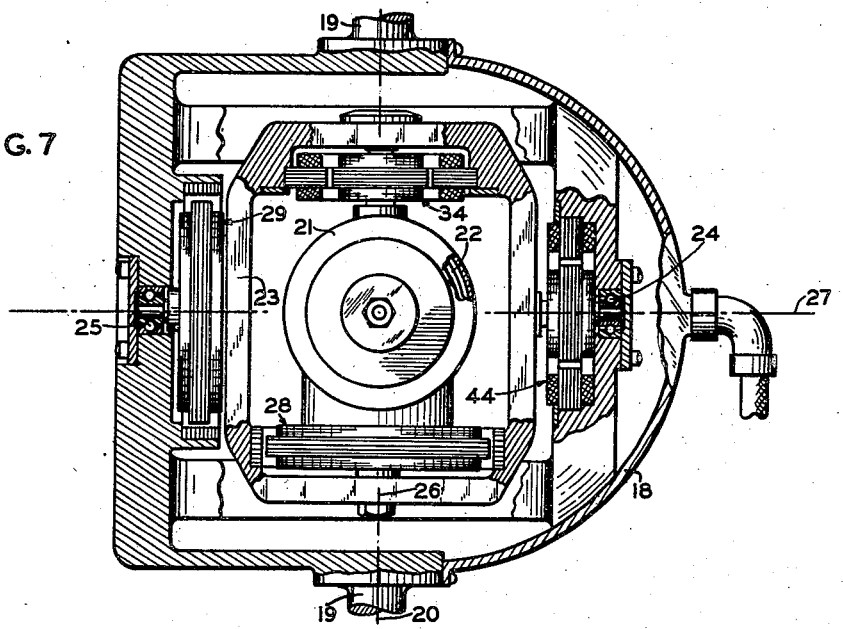
Fig. 7 is an enlarged plan view of the gyroscopic instrument.

In the showing of the invention in Figs. 1 to 3 inclusive, the improved radio scanning apparatus includes an antenna for transmitting or receiving ultra high frequency waves of electromagnetic energy. The representative antenna illustrated comprises a reflector 10 which in this instance is paraboloid in shape, the axis of symmetry of the reflector as indicated at 11 providing the directive axis of the antenna. A suitable electromagnetic energy radiator in the form of a wave guide 12 supplies energy to or receives energy from the antenna. As shown, the antenna is mounted on a frame or yoke 13 for pivotal movement on axis 14 which is hereinafter termed the horizontal axis or the nod axis of the antenna. The frame and antenna thereon are also mounted for pivotal movement about a second axis designated at 15 that is perpendicular to axis 14. Antenna axis 15 is the vertical axis thereof in the present instance. As shown in Fig. 1, the frame 13 is pivotally mounted in a fixed post 16 that extends from the bottom or base 17 of the craft or body on which the antenna is employed. The vertical axis is hereinafter termed the spin or oscillating axis of the antenna, suitable motive means (not shown) being used in this connection to control the movement of the antenna as desired. In accordance with the teaching of the present invention, the frame 13 is constructed to position the respective axes of the antenna in offset relation so that a gyroscopic instrument may also be mounted thereon.

The gyroscopic instrument employed comprises a casing 18 having trunnions 19 fixed thereto by which the same is pivotally mounted on the frame 13 of the antenna. The axis of the casing 18 of the gyroscope on the frame is indicated at 20, this axis being positioned parallel to the nod or horizontal axis 14 of the antenna as clearly shown in Fig. 3. The frame also mounts the casing 18 so that axis 20 intersects the vertical axis 15 of the antenna with these respective axes being situated in mutually perpendicular relation.

Vertical axis 15 is the azimuth axis of the radio scanning apparatus.

With particular reference to Fig. 7, the gyro instrument shown has a universally mounted rotor bearing case 21 with a rotor 22 therein, that spins about a normally vertical axis. Suitable means (not shown) is provided to spin the rotor 22. The casing of the instrument is situated on the antenna frame 13 so that the spin axis of the rotor 22 is normally coincident with the axis 15 of the antenna. Movement of the antenna about axis 15 will consequently not effect precession of the rotor case to move the axis of the rotor from its proper position. A gimbal ring 23 is provided to mount the rotor case 21 for universal movement relative to the casing 18. The major axis of pivotal movement for the case 21 is defined by the trunnions fixed to gimbal ring 23 which journal in spaced bearings 24, 25. The rotor case 21 is also pivotally mounted on the gimbal ring 23 for movement about a minor axis normal to the major axis thereof. The minor axis of the rotor case as indicated at 26 is normally coincident with the casing axis 20. The major axis of the rotor case 21 as indicated at 27 is coincident with the axis of symmetry 11 of the antenna when the angle of nod of the reflector 10 about axis 14 is zero. The intersection of the major and minor axes of the rotor case 21 occurs at a point situated on the azimuth or vertical axis 15 of the antenna to obviate the effect of centrifugal force on the gyroscopic instrument due to spinning movement of the antenna. A suitable vertical reference for the gyro is provided such as a liquid level switch (Fig. 9) that is situated on the case 21 as near the intersection point of the major and minor axes of the case as possible and centered on the gyro spin axis. Torque motors of conventional form may be controlled by the switch to effect precession of the rotor case in a direction that erects the rotor 22 so that the spin axis thereof is maintained in a vertical position. In Fig. 7, the motor for exerting a torque about the minor axis of the case 21 is indicated at 28. A similar motor effective about the major axis of the case 21 is indicated at 29. It will be understood that the present invention is not directed to the erection control of a gyroscopic instrument of the gyro vertical type as herein shown so that any conventional means having a reference member on the rotor case normally situated along the vertical axis of the antenna may be employed in this connection.

In accordance with the teaching of the present invention, means are provided to maintain parallelism between the casing 18, and the reflector 10 of the antenna relative to the respective parallel axes 20 and 14 thereof. In Figs. 2 and 3, this means is shown as a parallel motion mechanism comprising a link 30, one end of which is pivotally connected to the reflector 10 of the antenna. The opposite end of the link 30 is pivotally connected to a gear sector 31 that is fixed to one of the trunnions of the casing of the gyroscopic instrument. The antenna is positioned about its nod axis by a servo motor designated at 32 that is fixed to the frame 13, the servo motor driving a pinion 33 that meshes with the gear sector 31. The driver pinion 33 is effective to control the parallel motion linkage to simultaneously position both the reflector 10 and the casing 18.

Figure 8:
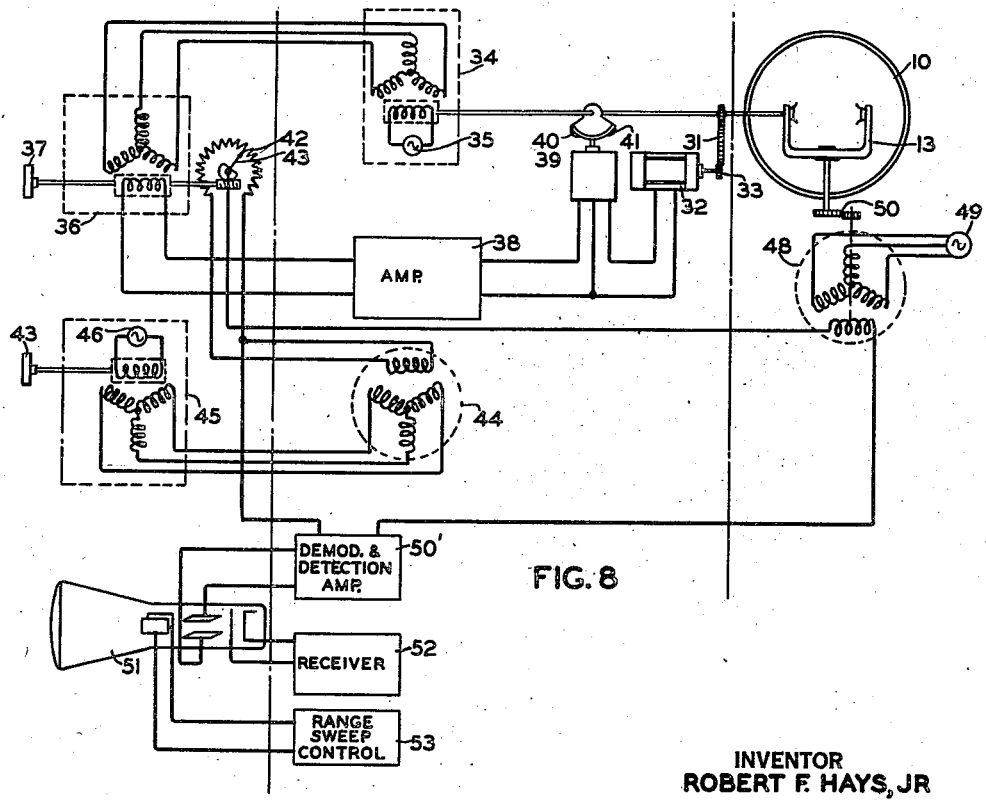
Fig. 8 is a circuit diagram showing the electrical connections between the schematically represented parts of the apparatus.

The gyro controlled radio scanner includes means for controlling the servo motor 32 shown in the form of a "Selsyn" type pickoff indicated at 34, Figs. 7 and 8, that detects relative tilt of the casing 18 and rotor case about the respective normally coincident axes 20 and 26 by producing a voltage signal whose phase sense and magnitude are determined by the direction and extent of the angular displacement that may occur. One winding of the signal generating pickoff 34 as shown in Fig. 8 receives energy from a suitable A. C. source 35. The pickoff 34 of the gyroscopic instrument is situated in a circuit with a similar signal generator 36 whose control knob 37 is set by the operator of the scanner to position the antenna at a desired angle of nod about its horizontal axis 14. The three phase windings of pickoff 34 and generator 36 are opposingly connected. The single phase winding of the generator 36 is arranged to turn with the knob 37 and be positioned thereby to produce a signal output that controls the servo motor 32 and the antenna. The output of the generator 36 is fed to the servo motor 32 by way of an amplifier 38 and suitable circuit breaking means 39. No details of the amplifier 38, the circuit breaking means, or the servo motor have been shown in the drawings as these parts may be of well known construction. For a given nod angle setting for the antenna by the knob 37, with null output from the pickoff 34, a voltage output is produced by the generator 36 that causes the servo motor to drive pinion 33 and move sector gear 31 to simultaneously move casing 18 and reflector 10 in the direction desired. The pickoff 34 then builds up an opposing voltage to the voltage produced by generator 36 so that when the circuit has a null voltage output the reflector is positioned at the desired nod angle relative to a true vertical. If this angle changes, with no change in the setting of knob 37, the pickoff 34 detects the same. A voltage is then produced by the pickoff which operates the servo motor 32 in a direction to restore the casing and reflector to the original nod angle. With a zero nod angle setting of the knob 37 of generator 36, the servo motor 32 responds to an output signal from the pickoff 34 to restore the rotor case 21 and casing 18 to a tilt free condition about their respective axes 26 and 20. This restoring movement also causes corresponding movement of the reflector through the parallel motion linkage between the casing 18 and the reflector 10. The antenna is consequently gyro-stabilized about the horizontal or nod axis thereof.

Movement of the antenna about its horizontal axis is limited by means of cams 40 and 41 located on the gear sector 31, Fig. 2, and represented schematically in Fig. 8. When effective, the respective cams operate the circuit breaking means 39 to open the circuit which includes the servo motor 32. This prevents operation of the servo motor beyond the permitted limits of movement of the antenna about axis 14.

The servo motor 32 and parallel motion mechanism provided form a normally ineffective means for moving the reflector of the antenna and the casing of the gyro instrument correspondingly about their respective parallel axes on the frame of the apparatus. Pickoff 34 under control of the gyro instrument provides a means for rendering the moving means or servo motor effective. The signal generator 36 provides a controlling means for the servo motor 32 that is effective to position the antenna at a desired angle of nod within the permitted range of its limited movement. Servo motor 32 is then controlled by the pickoff 34 at the gyro vertical which functions to stabilize the antenna at the position set for the same by the knob 37 of the signal generator 36.

In accordance with the teaching of the present invention, the antenna is mounted for movement about mutually perpendicular axes and the casing of the gyro vertical is pivotally mounted on the antenna frame with the axis thereof parallel to one of the axes of the antenna. The spin axis of the universally supported rotor case of the gyro vertical is positioned so as to be normally coincident with the other axis of the antenna. In the construction shown, the spin axis of the rotor of the gyro instrument is normally coincident with the vertical axis of the antenna and the axis of the casing of the gyro instrument is parallel to the horizontal axis of the antenna. To obtain this arrangement, the frame of the scanner offsets the respective axes of the antenna. In the provided construction, the gimbal axis of the rotor of the gyro vertical is arranged in parallel relation to the directive axis of the antenna. The directive axis of the antenna corresponds with the axis of symmetry of the reflector, these axes being normal to the axis of nod of the antenna. When the angle of nod is zero, the gimbal axis of the rotor of the gyro vertical is coincident with the directive axis of the antenna.

With reference to Figs. 4, 5 and 6, the sighting angle of the radio scanning apparatus is herein defined as the angle between the vertical and the directive axis of the antenna which corresponds with the axis of symmetry of the reflector 10. This angle is designated at A in Fig. 4. The improved scanning apparatus operates to stabilize or control the sighting angle A thereof, so the same is independent of the attitude of the dirigible craft on which it is employed as the antenna spins or oscillates in azimuth about its vertical axis 15. Signal generator 36 controls the sighting angle of the apparatus by determining the nod angle of the antenna with the pickoff 34 of the gyro instrument exercising the stabilizing effect thereon as hereinbefore described. A truly vertical reference axis is, therefore, provided for the antenna with regard to one of the axes of universal support of the rotor case of the gyro vertical. Tilt of the axis of the gyro casing out of a horizontal plane due to movement of the craft carrying the antenna about its bank axis does not affect the sighting angle of the antenna inasmuch as the gimbal axis of the rotor is parallel to or coincident with the directive axis of the antenna at all times. Consequently, the sighting angle of the antenna is independent of the attitude of the dirigible craft on which the apparatus is employed.

While the sighting angle A is stabilized in the improved apparatus, an azimuth error as indicated by angle B, Fig. 6, is introduced by tilt of the nod axis of the antenna from a horizontal position due to bank of the craft such as indicated by angle C, Fig. 5. The scanner makes a correction for the azimuth error in accordance with the following equation:

Tangent of correction angle B=tangent of roll or bank angle C × sine of the nod angle D from the horizontal.

Alternatively, in apparatus in which the nod angle D is confined to angular movement of thirty degrees or less and where the bank angle C is to be limited to thirty degrees, a close approximation of the correction angle required may be obtained in accordance with the following equation:

Sine of correction angle B=sine of roll or bank angle C × nod angle D.

An electrical signal that is either proportional to the nod angle D or a linear function of the sine of the angle thereof is obtained by means of a potentiometer 42, Fig. 8, whose movable arm 42 is positioned by the nod angle control knob 37. A signal linear to either the tangent or sine of the roll or bank angle may be obtained in the present instance by a further "Selsyn" type pickoff indicated at 44 in Fig. 7, controlled by the gyro vertical. One of the windings of the pickoff 44 is fixed to the casing 18 of the gyro instrument and the other winding thereof is positioned by the gimbal ring 23. Upon angular displacement or tilt of the gyro instrument about the gimbal axis thereof, the pickoff 44 produces a signal similar to that of pickoff 34 hereinbefore described. As shown in Fig. 8, the single phase winding of the pickoff 44 is connected across the potentiometer 42. The three phase windings of pickoff 44 are connected to a similar winding of a "Selsyn" type signal generator 45, Fig. 8. The single phase winding of generator 45 is energized from a suitable A. C. source 46, this winding being mounted for movement with a control knob 43 settable by the operator of the apparatus to introduce a voltage signal for a given roll angle setting of the control knob 43. The pickoff 44 at the gyro is effective to determine any departure from the desired angle of tilt about this axis and either adds to or subtracts from the voltage signal from the generator 45 so that a given signal is produced for a particular setting of the control knob 43.

The correction voltage obtained is combined with a voltage from the single phase winding of a "Selsyn" type signal generator 48, Fig. 8, that rotates or oscillates with the antenna about its vertical axis. The fixed winding of this generator is supplied with energy from source 49 and the movable winding is driven by antenna frame 13 by means of suitable gearing indicated at 50. The resultant voltage is fed to a suitable demodulator and detection amplifier as indicated at 50' and then applied to the vertically positioned plates of a cathode ray tube 51. The receiver for the scanner is indicated at 52, the same providing the input for the tube 51. The electron beam of the tube is deflected by the correction voltage so that the position of the object picked up by the scanner and presented on the indicating face of the tube 51 is corrected for the described azimuth error. A range sweep control 53 moves the electron beam in a horizontal plane across the indicating face of the tube in a conventional manner.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus other types of gyro verticals, i. e. gyroscopic instruments for maintaining a vertical or horizontal reference, may be employed than the one herein shown, within the scope of my invention.

What is claimed is:

1. In a radio scanning apparatus, an antenna, a frame of which said antenna is mounted for movement about respective vertical and horizontal axes, a gyro vertical having a casing pivotally mounted on said frame on an axis parallel to the horizontal axis of the antenna, and means for maintaining parallelism of the casing and antenna relative to the respective horizontal axes thereof.

2. In a radio scanning apparatus, an antenna, a frame on which said antenna is mounted for movement about respective vertical and horizontal axes, a gyro vertical including a casing pivotally mounted on said frame and a rotor universally mounted in said casing with the spin axis thereof normally coincident with the vertical axis of the antenna, and a parallel motion mechanism linking the casing of the gyro vertical and the antenna.

3. Apparatus as claimed in claim 2, including erecting means for the gyro vertical having a reference element normally situated along the vertical axis of the antenna.

4. In a radio scanning apparatus, an antenna, a frame on which said antenna is mounted for movement about mutually perpendicular spin and nod axes, a gyro instrument including a casing pivotally mounted on said frame for movement about an axis parallel to the nod axis of the antenna and rotor pivotally mounted in said casing on mutually perpendicular major and minor axes, the minor axis of which is normally coincident with the axis of the casing, and means for positioning the antenna about its nod axis including a parallel motion linkage to said casing.

5. In a radio scanning apparatus, an antenna, a frame on which said antenna is mounted for movement about mutually perpendicular spin and nod axes, a gyro instrument including a casing pivotally mounted on said frame for movement about an axis parallel to the nod axis of the antenna and rotor universally supported in said casing with the spin axis thereof normally coincident with the spin axis of the antenna, and means for maintaining parallelism between the antenna and casing effective about the respective parallel disposed axes thereof.

6. In a radio scanning apparatus, an antenna, a frame on which said antenna is mounted for movement about mutually perpendicular spin and nod axes, a gyro vertical including a casing pivotally mounted on said frame for movement about an axis parallel to the nod axis of the antenna and rotor pivotally mounted in said casing on normally horizontal, mutually perpendicular, major and minor axes, the minor axis of which is normally coincident with the axis of the casing, and a parallel motion linkage connecting the casing and antenna for positioning said antenna about its nod axis.

7. In a radio scanning apparatus, an antenna, a frame on which said antenna is mounted for movement about mutually perpendicular spin and nod axes, a gyro vertical including a casing pivotally mounted on said frame for movement about an axis parallel to the nod axis of the antenna and rotor universally supported in said casing with the spin axis thereof normally coincident with the spin axis of the antenna, and a parallel motion linkage connecting the casing and antenna for positioning said antenna about its nod axis.

8. In a radio scanning apparatus, an antenna, a frame on which said antenna is mounted for movement about respective vertical and horizontal axes, a gyro vertical including a casing pivotally mounted on said frame for movement about an axis parallel to the horizontal axis of the antenna, a gimbal mounted in said casing for movement about an axis normal to the axis of the casing, a gyro rotor case pivotally mounted on said gimbal for movement about an axis normally parallel to the horizontal axis of the antenna and perpendicular to the vertical axis of the antenna, and a parallel motion linkage connecting the casing and antenna for positioning said antenna about its horizontal axis.

9. A gyro controlled radio scanner having antenna means movable about vertical and horizontal axes, means for controlling said antenna means about its horizontal axis comprising a gyro vertical having a casing movable about an axis parallel to the horizontal axis of the antenna, a universally supported rotor case in said casing, one of whose axes is normally coincident with the axis of the casing, a pickoff detecting tilt of the rotor case about the axis thereof normally coincident with the axis of the casing, servo means responsive to the output of said pickoff for moving said casing to restore the rotor case to a tilt-free condition, and means driven by the servo means for correspondingly moving said antenna about its horizontal axis.

10. A gyro controlled radio scanner having antenna means movable about mutually perpendicular spin and nod axes, means for controlling said antenna means about its nod axis comprising a gyro vertical having a casing movable about an axis parallel to the nod axis of the antenna, a universally supported rotor case in said casing, one of whose axes is normally coincident with the axis of the casing, a pickoff detecting tilt of the rotor case about the axis thereof normally coincident with the casing axis, servo means responsive to the output of said pickoff for moving said casing to restore the rotor case to a tilt-free condition, and a parallel motion linkage connecting the casing and antenna for positioning said antenna about its nod axis.

11. In a gyro controlled radio scanner, an antenna, a frame on which said antenna is pivotally mounted, a gyro instrument having a casing pivotally mounted on said frame on an axis parallel to the axis of the antenna, a universally mounted rotor case in said casing, one of whose axes is normally coincident with the axis of the casing, a pickoff detecting tilt of the rotor case about the axis thereof normally coincident with the axis of the casing, a servo means on said frame responsive to the output of said pickoff for moving said casing to restore the rotor case to a tilt-free condition, and a parallel motion transmitting means connecting said casing and antenna.

12. In a gyro stabilized radio scanner, an antenna, a gyro vertical having a casing, a frame on which said antenna and gyro vertical casing are pivotally mounted on respective parallel axes, normally ineffective means for moving said antenna and gyro vertical casing correspondingly about their respective axes, and means under control of said gyro vertical for rendering said moving means effective.

13. In a gyro stabilized radio scanner, an antenna, a frame on which said antenna is mounted for nodding movement about a horizontal axis, a gyro vertical having a casing pivotally mounted on said frame on an axis parallel to the horizontal axis of the antenna, normally ineffective means for moving said antenna and gyro vertical casing correspondingly about their respective axes, and means under control of said gyro vertical for rendering said moving means effective.

14. A scanner of the character claimed in claim 13, including means for limiting the movement of said moving means.

15. In a gyro stabilized radio scanner, an antenna, a frame on which said antenna is pivotally mounted for movement between predetermined limits about an axis, a gyro instrument having a casing pivotally mounted on said frame on an axis parallel to the axis of the antenna, servo means for moving said antenna and gyro casing correspondingly about their respective axes, means for controlling said servo means to position said antenna within the range of limits of its movement, and means at the gyro instrument for stabilizing said antenna at the position thereof determined by said controlling means.

16. In a gyro stabilized radio scanner, an antenna, a frame on which said antenna is pivotally mounted for nodding movement between predetermined limits about a horizontal axis, a gyro vertical having a casing pivotally mounted on said frame on an axis parallel to the axis of the antenna, servo means for moving said antenna and gyro vertical casing correspondingly about their respective axes, means for controlling said servo means to position said antenna at a desired angle of nod within the range of its limits of movement, and means at the gyro vertical for stabilizing said antenna at the position thereof determined by said controlling means.

17. The combination in a radio scanner of an antenna, a gyro instrument having a casing and a universally supported rotor, a frame on which the antenna is mounted for movement about mutually perpendicular axes and on which the casing of the gyro instrument is pivotally mounted on an axis parallel to one of the axes of the antenna with the spin axis of the rotor normally coincident with the other of the axes of the antenna.

18. The combination in a radio scanner of an antenna, a gyro vertical having a casing and a universally supported rotor, a frame on which the antenna is mounted for movement about vertical and horizontal axes and on which the casing of the gyro vertical is pivotally mounted on an axis parallel to the horizontal axis of the antenna and with the spin axis of the rotor normally coincident with the vertical axis of the antenna.

19. The combination in a radio scanner of an antenna, a gyro vertical having a casing and a universally supported rotor, a frame on which the antenna is mounted for movement about mutually perpendicular spin and nod axes and on which the casing of the gyro vertical is pivotally mounted on an axis parallel to the nod axis of the antenna and with the spin axis of the rotor normally coincident with the spin axis of the antenna.

20. A gyro controlled radio scanner including an antenna having a directive axis, a gyro vertical having a casing and a gimbal mounted universally supported rotor therein, a frame on which the antenna is mounted for movement about a horizontal axis normal to the directive axis thereof and on which the casing of the gyro vertical is pivotally mounted on an axis parallel to the horizontal axis of the antenna with the gimbal axis of the rotor arranged in parallel relation to the directive axis of the antenna.

21. A radio scanning apparatus for dirigible craft having a directive antenna movable about a normally vertical axis and a normally horizontal axis with reference to the craft, settable means for sighting the directive antenna at a desired angle with reference to a truly vertical axis, and means for stabilizing said antenna to maintain the sighting angle thereof constant and independent of the attitude of the craft.

22. A radio scanning apparatus having a directive antenna movable about a normally horizontal axis, settable means for sighting the directive antenna at a desired angle with reference to a truly vertical axis, means for stabilizing said antenna to maintain the sighting angle thereof constant, indicating means for said scanning apparatus, and means for correcting the indication of said indicating means for error due to tilt of the normally horizontal axis of the antenna out of a horizontal plane.

23. An apparatus as claimed in claim 22, in which said error correcting means is effective in accordance with the product of the tangent of the angle of tilt of the normally horizontal axis of the antenna and sine of the angle of nod of the antenna from a horizontal plane.

24. An apparatus as claimed in claim 22, in which said error correcting means is effective in accordance with the product of the sine of the angle of tilt of the normally horizontal axis of the antenna and the angle of nod of the antenna from a horizontal plane.

ROBERT F. HAYS, Jr.